United States Patent
Zhao

(10) Patent No.: US 9,007,948 B2
(45) Date of Patent: Apr. 14, 2015

(54) DISTANCE MEASUREMENT AND ALARM METHOD AND APPARATUS

(71) Applicant: Huawei Device Co., Ltd., Shenzhen (CN)

(72) Inventor: Lei Zhao, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 107 days.

(21) Appl. No.: 13/848,390

(22) Filed: Mar. 21, 2013

(65) Prior Publication Data

US 2013/0287011 A1    Oct. 31, 2013

(30) Foreign Application Priority Data

Apr. 27, 2012    (CN) .......................... 2012 1 0128383

(51) Int. Cl.
| | |
|---|---|
| H04W 4/02 | (2009.01) |
| H04W 4/20 | (2009.01) |
| H04W 4/22 | (2009.01) |

(52) U.S. Cl.
CPC ............ *H04W 4/02* (2013.01); *H04W 4/023* (2013.01); *H04W 4/206* (2013.01); *H04W 4/22* (2013.01)

(58) Field of Classification Search
None
See application file for complete search history.

(56) References Cited

U.S. PATENT DOCUMENTS

| | | | |
|---|---|---|---|
| 7,974,637 B1 * | 7/2011 | Taveniku | 455/456.1 |
| 2006/0019679 A1 * | 1/2006 | Rappaport et al. | 455/456.5 |
| 2007/0279237 A1 | 12/2007 | Julian et al. | |
| 2009/0034591 A1 * | 2/2009 | Julian et al. | 375/220 |
| 2009/0135730 A1 * | 5/2009 | Scott et al. | 370/252 |
| 2009/0265470 A1 | 10/2009 | Shen et al. | |
| 2011/0319022 A1 | 12/2011 | Arad et al. | |
| 2012/0214515 A1 * | 8/2012 | Davis et al. | 455/456.3 |
| 2013/0017842 A1 * | 1/2013 | Gupta et al. | 455/456.1 |
| 2013/0184012 A1 * | 7/2013 | Gupta et al. | 455/456.6 |

FOREIGN PATENT DOCUMENTS

| | | |
|---|---|---|
| CN | 101188645 A | 5/2008 |
| CN | 101212780 A | 7/2008 |
| CN | 101427543 A | 5/2009 |
| CN | 102186139 A | 9/2011 |
| CN | 102388348 A | 3/2012 |
| WO | WO 2010/064235 A1 | 6/2010 |

* cited by examiner

*Primary Examiner* — Kerri Rose
(74) *Attorney, Agent, or Firm* — Brinks Gilson & Lione

(57) ABSTRACT

Embodiments of the present invention relate to a distance measurement and alarm method and apparatus. The method includes: sending pairing request information for establishing a connection with a receiving terminal; after the receiving terminal is paired with, calculating a current distance to the receiving terminal; comparing the current distance with a preset distance threshold, and if the current distance exceeds the distance threshold, displaying distance prompt information.

10 Claims, 3 Drawing Sheets

DISTANCE MEASUREMENT AND ALARM METHOD AND APPARATUS

CROSS-REFERENCE TO RELATED APPLICATION

This application claims priority to Chinese Patent Application No. 201210128383.1, filed on Apr. 27, 2012, which is hereby incorporated by reference in its entirety.

TECHNICAL FIELD

The present invention relates to the field of communications, and in particular, to a distance measurement and alarm method and apparatus.

BACKGROUND

At present, in many application scenarios, azimuth or distance information needs to be provided, and the azimuth or distance information is applied to emergency communications, road mapping or some military missions.

In the prior art, a fundamental principle of a global positioning system (Global Positioning System, GPS) is to measure a distance between a satellite with a known position and a receiver of a user, and then a specific position of the user can be known by combining data of a plurality of satellites. A distance between the user and the satellite is obtained by recording time for a satellite signal to be transmitted to the user, and then multiplying the time by propagation speed of an electromagnetic wave.

When a GPS satellite works normally, the GPS satellite continuously uses a pseudo-random code (pseudo code for short) formed by binary code elements 1 and 0 to transmit a navigation message. The navigation message includes information such as satellite ephemeris, working condition, clock correction, ionospheric delay correction and atmospheric refraction correction. The navigation message is obtained by demodulating a satellite signal, and is modulated at 50 b/s on a carrier frequency for transmission. Each main frame of the navigation message includes 5 subframes, and a length of each subframe is 6 s. Each of first three frames has 10 character codes, which are repeated every 30 seconds and updated once per hour. Last two frames are 15000 b in total. When receiving a navigation message, the user extracts satellite time and compares the satellite time with the user's own clock to know a distance between a satellite and the user, and then uses satellite ephemeris data in the navigation message to calculate a position where the satellite is located when transmitting the message, so information such as position and speed of the user in a geodetic coordinate system can be known.

However, in practical applications, some problems exist in a civilian GPS system. For example, when a GPS technology is adopted to calculate a distance between a satellite with a known position and a user, after time is determined, speed is the propagation speed of the electromagnetic wave, but in a propagation process of the electromagnetic wave in the atmosphere, a signal is susceptible to interference in the ionosphere and the troposphere, so the GPS system can only perform average calculation on the signal, which causes low precision in distance calculation.

SUMMARY

Embodiments of the present invention disclose a distance measurement and alarm method and apparatus, so as to solve a problem of low precision in distance measurement between terminals in the prior art.

In a first aspect, an embodiment of the present invention provides a distance measurement and alarm method, where the method includes:

sending pairing request information for establishing a connection with a receiving terminal;

after the receiving terminal is paired with, detecting a current distance to the receiving terminal; and comparing the current distance with a preset distance threshold, and if the current distance exceeds the distance threshold, displaying distance prompt information.

In a second aspect, an embodiment of the present invention provides a distance measurement and alarm apparatus, where the apparatus includes:

a sending unit, configured to send pairing request information for establishing a connection with a receiving terminal;

a measuring unit, configured to, after the receiving terminal is paired with, detect a current distance to the receiving terminal; and a first executing unit, configured to compare the current distance with a preset distance threshold, and if the current distance exceeds the distance threshold, display distance prompt information.

DESCRIPTION OF EMBODIMENTS

To make the objectives, technical solutions, and advantages of the embodiments of the present invention more comprehensible, the following clearly describes the technical solutions in the embodiments of the present invention with reference to the accompanying drawings in the embodiments of the present invention.

With the popularization and use of a wireless fidelity direct (Wireless Fidelity Direct, Wi-Fi Direct) technology, more and more user terminals are equipped with a Wi-Fi Direct function. The Wi-Fi Direct technology is: In a wireless network, user terminals are permitted to connect to each other without a wireless router, so as to complete tasks such as sharing, synchronization and display in a simpler and more convenient manner. The Wi-Fi Direct technology establishes connections by forming groups (in a one-to-one or a one-to-many topological form), and a theoretical effective communication distance between a plurality of user terminals equipped with the Wi-Fi Direct function is within 300 m.

In the embodiments of the present invention, the Wi-Fi Direct technology is adopted, this technology is applied to application scenarios in which distance measurement and alarm is required for children, pets, articles that are easily lost, and a low-cost and convenient distance measurement and alarm prompt method is provided.

Figure 1:
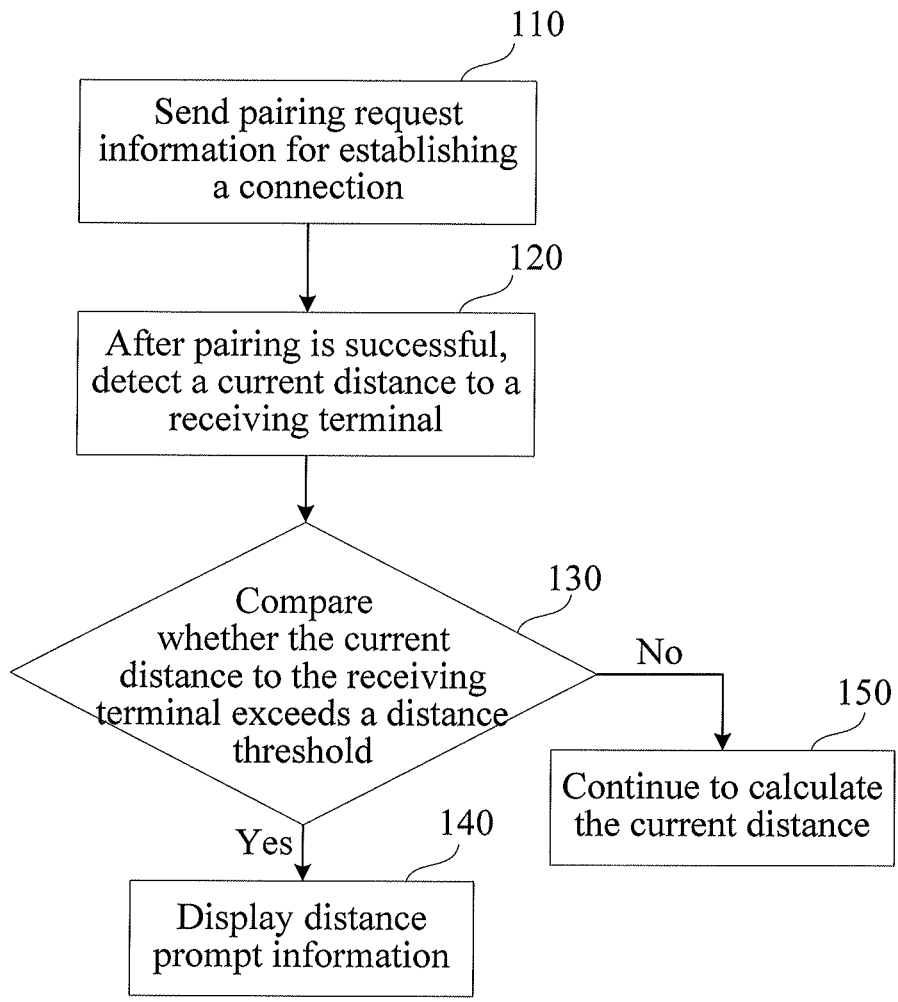
FIG. 1 is a flow chart of a distance measurement method according to an embodiment of the present invention.

A distance measurement method disclosed in an embodiment of the present invention is described in detail in the following by taking FIG. 1 as an example. FIG. 1 is a flow chart of a distance measurement method according to an embodiment of the present invention.

As shown in FIG. 1, in the embodiment of the present invention, an original distance exists between a sending terminal A (hereinafter referred to as terminal A) and a receiving terminal B (hereinafter referred to as terminal B), both the terminal A and the terminal B are equipped with a wireless fidelity direct Wi-Fi Direct standard, and are, for example, a mobile phone and a computer. The terminal A sends pairing request information for establishing a connection with the terminal B through the Wi-Fi Direct standard; the terminal B validates the pairing request information, and then makes a response; and after receiving response information, the terminal A sets a distance threshold for prompting an alarm, the terminal A determines whether a current distance between the terminal A and the terminal B exceeds the distance threshold, and if the current distance between the terminal A and the terminal B exceeds the distance threshold, the terminal A displays alarm information to prompt the terminal A that the distance between the terminal A and the terminal B exceeds a preset distance threshold. A user makes a corresponding judgment according to distance prompt information displayed by the terminal A, and specific implementation steps are as follows:

Step 110: Send pairing request information for establishing a connection with a receiving terminal.

Specifically, an original distance exists between the terminal A and the terminal B, and both the terminal A and the terminal B are equipped with a Wi-Fi Direct standard, and are, for example, a mobile phone and a computer. The terminal A sends the pairing request information for establishing a connection with the terminal B through the Wi-Fi Direct standard.

The Wi-Fi Direct standard is to permit terminals in a wireless network to connect to each other without a wireless router.

The terminal B validates the pairing request information, and then makes a response; after the terminal A receives response information, a prompt box for inputting the original distance pops up in the terminal A, and the user inputs a specific value of the original distance according to the prompt box. In a calculation model of an outdoor near visual range, a theoretical distance exists between the terminal A and the terminal B, and the theoretical distance is a distance which is between the terminal A and the terminal B and is obtained in an environment where signal strength is uniform and no building blockage is present between the terminal A and the terminal B; and the original distance is a distance which is between the terminal A and the terminal B and is obtained in an environment where signal strength is not uniform due to blockages such as buildings and impurities between the terminal A and the terminal B. Therefore, a certain difference exists between the theoretical distance and the original distance, and according to the difference between the theoretical distance and the original distance, a channel model equation is selected from a plurality of mathematical models in a database program.

Step 120: After the receiving terminal is paired with, calculate a current distance to the receiving terminal.

Specifically, after receiving the response information, the terminal A selects a channel model equation from a plurality of mathematical models in a database program, and the channel model equation is used for calculating the current distance between the terminal A and the terminal B.

The terminal A displays a channel model equation selection list, and the list displays a plurality of channel model equations selected by the terminal A according to the difference between the theoretical distance and the original distance. Each channel model equation may be used; however, after each channel model equation, calculation precision for calculating the distance between the terminal A and the terminal B by using each equation is listed. For example, calculation precision is optimal, and an error range is ±0.1%; calculation precision is less optimal, and an error range is ±0.5%; and calculation precision is normal, and an error range is ±1%. Finally, the user selects a suitable equation. Therefore, in the embodiment of the present invention, the selected channel model equation is the equation with the optimal calculation precision, so as to reduce a calculation error and improve accuracy of distance calculation.

In the embodiment of the present invention, the selected optimal channel model equation is a function related to space signal strength and a bit error rate, and a specific form of the equation is:

$$PL = K + 26*\log(d) + 20*\log(f);$$

where,

PL is path loss;

f is a working frequency;

d is a current distance; and

K is a constant.

After an optimal channel model equation is selected, a prompt box for setting a distance threshold of prompting an alarm pops up in the terminal A, and the user inputs the distance threshold according to the prompt box. Because the distance between the terminal A and the terminal B keeps changing, the terminal A needs to detect space signal strength and a bit error rate regularly, and calculate the current distance between the terminal A and the terminal B through the channel model equation.

In the embodiment of the present invention, a selected PL channel model equation is taken as an example to describe a process of calculating the current distance. In practical applications, a signal model equation is selected as appropriate according to the difference between the theoretical distance and the original distance.

Step 130: Compare the current distance with a preset distance threshold.

Specifically, according to the description of step 110 and step 120, the terminal A compares the current distance which is between the terminal A and the terminal B and is calculated according to the channel model equation with a set distance threshold, determines whether the current distance between the terminal A and the terminal B exceeds the distance threshold, and if the current distance between the terminal A and the terminal B exceeds the distance threshold, executes step 140; otherwise, executes step 150, continues to detect the space signal strength and the bit error rate regularly, and calculates the current distance between the terminal A and the terminal B through the channel model equation.

Step 140: If the current distance to the receiving terminal exceeds the distance threshold, display alarm information.

Specifically, according to the determination in step 130, if the current distance between the terminal A and the terminal B exceeds the distance threshold, the terminal A displays distance prompt information to prompt the terminal A that the distance between the terminal A and the terminal B exceeds the preset distance threshold, and the user makes a corresponding judgment according to the distance prompt information displayed by the terminal A.

Step 150: Continue to calculate the current distance.

Specifically, according to the determination in step 130, if the current distance between the terminal A and the terminal B does not exceed the distance threshold, the terminal A continues to calculate the current distance according to the channel model equation.

In the embodiment of the present invention, the distance prompt information may be alarm information, for example, when the current distance exceeds the distance threshold, the terminal A displays alarm information, where the alarm information may be sound information or vibration information.

Through the description of the foregoing method, the channel model equation is selected according to the difference between the theoretical distance and the original distance, and the selected channel model equation is used for calculating the current distance. Because error coefficients for calculating the current distance by using channel model equations are different, when the user selects the optimal channel model equation, a distance measurement error may be reduced, and calculation accuracy of the current distance may be improved; when the current distance exceeds the distance threshold, prompt information is displayed, which is convenient for the user to check; moreover, the method may be further applied to homes, kindergartens or agricultural production, so as to achieve an objective of preventing articles from being lost at the same time.

Figure 2:
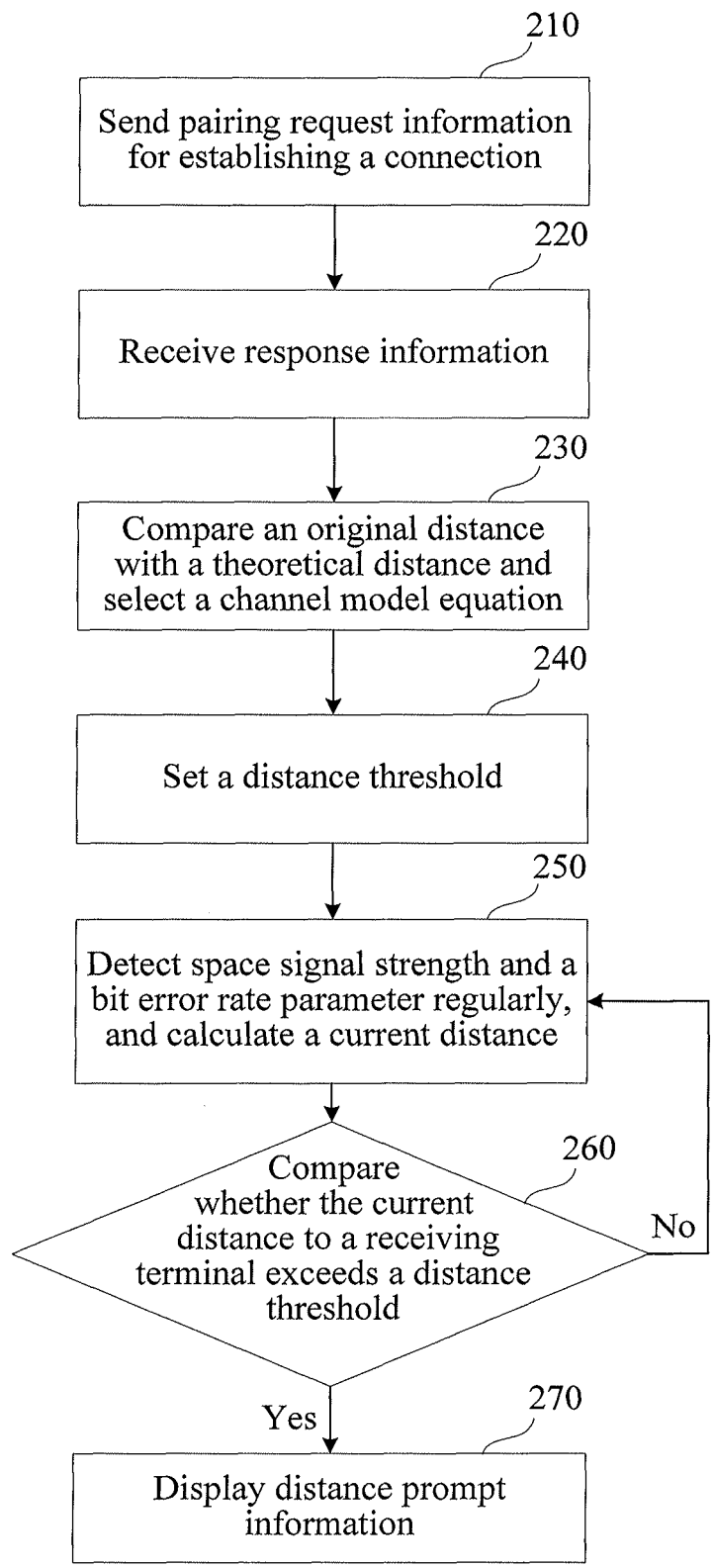
FIG. 2 is a specific flow chart of a distance measurement method according to an embodiment of the present invention.

A specific distance measurement and alarm method provided by an embodiment of the present invention is described in the following in detail by taking FIG. 2 as an example. FIG. 2 is a specific implementation flow chart of a distance measurement and alarm method according to an embodiment of the present invention.

As shown in FIG. 2, in the embodiment of the present invention, an original distance exists between a terminal A and a terminal B, both the terminal A and the terminal B are equipped with a wireless fidelity direct Wi-Fi Direct standard, and are, for example, a mobile phone and a computer. The terminal A sends pairing request information for establishing a connection with the terminal B through the Wi-Fi Direct standard; the terminal B validates the pairing request information, and then makes a response; and after receiving response information, the terminal A sets a distance threshold for prompting an alarm, the terminal A determines whether a current distance between the terminal A and the terminal B exceeds the distance threshold, and if the current distance between the terminal A and the terminal B exceeds the distance threshold, the terminal A displays alarm information to prompt the terminal A that the distance between the terminal A and the terminal B exceeds a preset distance threshold. A user makes a corresponding judgment according to distance prompt information displayed by the terminal A, and specific implementation steps are as follows:

Step 210: Send pairing request information for establishing a connection.

Specifically, an original distance exists between the terminal A and the terminal B. In the embodiment of the present invention, it is assumed that the original distance between the terminal A and the terminal B is 5 meters, and both the terminal A and the terminal B are equipped with a wireless fidelity direct Wi-Fi Direct standard, and are, for example, a mobile phone and a computer. The terminal A sends the pairing request information for establishing a connection with the terminal B through the Wi-Fi Direct standard.

The Wi-Fi Direct standard is to permit terminals in a wireless network to connect to each other without a wireless router.

Step 220: Receive response information.

Specifically, the terminal B validates the pairing request information, and then makes a response, and the terminal A receives the response information.

Step 230: According to a difference between a theoretical distance and an original distance, select a channel model equation.

Specifically, after the terminal A receives the response information, a dialog box pops up in the terminal A to prompt the user to input the original distance to the terminal B, and a manner for obtaining the original distance is: Before pairing is established with the terminal B, the user may select a position with coordinate information, and estimate the distance to the terminal B according to the coordinate information.

The user invokes a calculation model of an outdoor near visual range in the terminal A, uses the calculation model of the outdoor near visual range, transmission power of the terminal A and receiving sensitivity of the terminal B to calculate the theoretical distance between the terminal A and the terminal B. After the terminal A calculates the theoretical distance, the terminal A selects the channel model equation according to the difference between the theoretical distance and the original distance.

In the calculation model of the outdoor near visual range, a theoretical distance exists between the terminal A and the terminal B, and the theoretical distance is a distance which is between the terminal A and the terminal B and is obtained in an environment where signal strength is uniform and no building blockage is present between the terminal A and the terminal B; and the original distance is a distance between the terminal A and the terminal B in an environment where signal strength is not uniform due to blockages such as buildings and impurities between the terminal A and the terminal B.

Therefore, a certain difference exists between the theoretical distance and the original distance, and after the terminal A calculates the difference between the theoretical distance and the original distance, according to the difference between the theoretical distance and the original distance, a plurality of channel model equations matched with the difference is selected from a plurality of mathematical models in a database program.

After the terminal A calculates the difference between the theoretical distance and the original distance, the terminal A displays a channel model equation selection list, and the list displays a plurality of channel model equations selected by the terminal A according to the difference between the theoretical distance and the original distance. Each channel model equation may be used; however, after each channel model equation, calculation precision for calculating the distance between the terminal A and the terminal B by using each equation is listed. For example, calculation precision is optimal, and an error range is ±0.1%; calculation precision is less optimal, and an error range is ±0.5%; and calculation precision is normal, and an error range is ±1%. Finally, the user selects a suitable equation. Therefore, in the embodiment of the present invention, the selected channel model equation is the equation with the optimal calculation precision, so as to reduce a calculation error and improve accuracy of distance calculation.

For example, if the original distance between the terminal A and the terminal B is 5 meters, and the theoretical distance between the terminal A and the terminal B is 6 meters, the difference between the theoretical distance and the original distance is 1 meter, so the selected channel model equation is a function related to space signal strength and a bit error rate, and a specific form of the equation is:

$$PL = K + 26*\log(d) + 20*\log(f);$$

where,
PL is path loss;
f is a working frequency;
d is a current distance; and
K is a constant.

Step 240: Set a distance threshold.

Specifically, after an optimal channel model equation is selected, a prompt box for setting a distance threshold pops up in the terminal A, and the user inputs the distance threshold according to the prompt box. In the embodiment of the present invention, it is assumed that the distance threshold of prompting an alarm is 50 meters, and specific data of the distance threshold input by the user according to the prompt box to prompt an alarm is 50 meters.

Step 250: Detect space signal strength and a bit error rate parameter regularly, and calculate the current distance.

Specifically, according to the description of step 230, the terminal A selects a channel model equation according to the difference between the theoretical distance and the original distance, and calculates the current distance between the terminal A and the terminal B through the channel model equation. Because a relationship between the terminal A and the terminal B is not fixed, the distance between the terminal A and the terminal B keeps changing, the terminal A further needs to detect the space signal strength and the bit error rate regularly, and calculate the current distance between the terminal A and the terminal B through the channel model equation.

In the embodiment of the present invention, a selected PL channel model equation is taken as an example to describe a process of calculating the current distance. In practical applications, a signal model equation is selected as appropriate according to the difference between the theoretical distance and the original distance.

Step 260: Compare whether the current distance exceeds a distance threshold.

Specifically, according to the description of step 250, the terminal A compares the current distance which is between the terminal A and the terminal B and is calculated according to the channel model equation with a set distance threshold of 50 meters, determines whether the current distance between the terminal A and the terminal B exceeds the distance threshold of 50 meters, and if the current distance between the terminal A and the terminal B exceeds the distance threshold of 50 meters, executes step 270; otherwise, executes step 250, continues to detect the space signal strength and the bit error rate regularly, and calculates the current distance between the terminal A and the terminal B through the channel model equation.

Step 270: Display distance prompt information.

Specifically, according to the comparison in step 260, if the current distance between the terminal A and the terminal B exceeds the distance threshold of 50 meters, the terminal A displays distance prompt information to prompt the terminal A that the distance between the terminal A and the terminal B exceeds the preset distance threshold, and the user makes a corresponding judgment according to the distance prompt information displayed by the terminal A.

In the embodiment of the present invention, the distance prompt information may be alarm information. For example, when the current distance exceeds the distance threshold, the terminal A displays alarm information, where the alarm information may be sound information or vibration information.

Through the description of the foregoing method, the channel model equation is selected according to the difference between the theoretical distance and the original distance, and the selected channel model equation is used for calculating the current distance. Because error coefficients for calculating the current distance by using channel model equations are different, when the user selects the optimal channel model equation, a distance measurement error may be reduced, and calculation accuracy of the current distance may be improved; when the current distance exceeds the distance threshold, prompt information is displayed, which is convenient for the user to check; moreover, the method may be further applied to homes, kindergartens or agricultural production, so as to achieve an objective of preventing articles from being lost at the same time.

The channel model equation in the embodiment of the present invention is selected from the database program only in a form of an example. In practical applications, the foregoing embodiments are the description of the distance measurement and alarm method, and correspondingly, may also be implemented by using a distance measurement and alarm apparatus.

Figure 3:
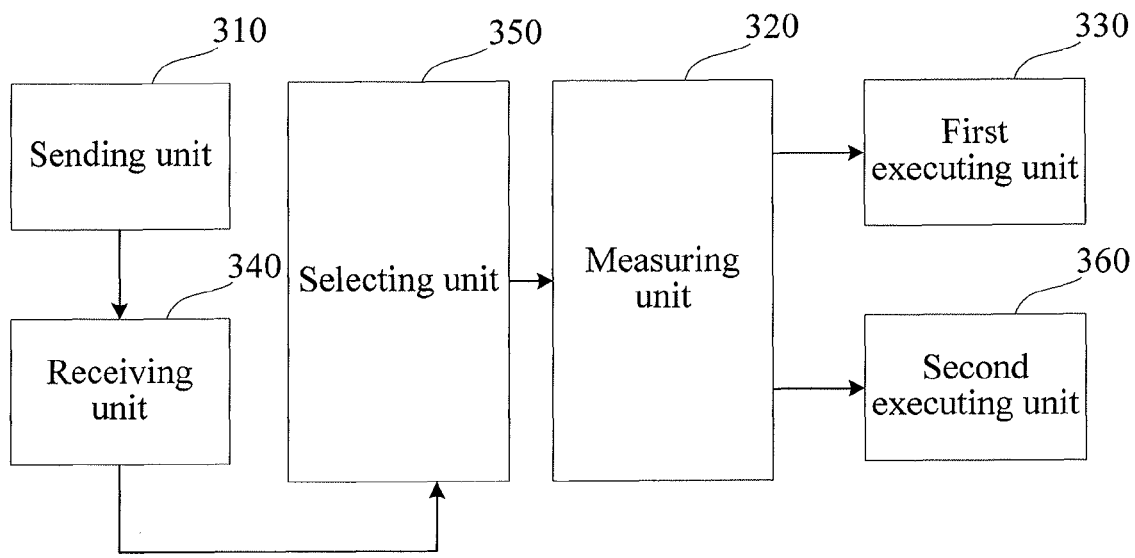
FIG. 3 is a diagram of a distance measurement apparatus according to an embodiment of the present invention.

FIG. 3 is a diagram of a distance measurement and alarm apparatus according to an embodiment of the present invention. As shown in FIG. 3, the distance measurement and alarm apparatus includes: a sending unit 310, a measuring unit 320, a first executing unit 330, a receiving unit 340, a selecting unit 350, and a second executing unit 360.

As shown in FIG. 3, the sending unit 310 in the apparatus is configured to send pairing request information for establishing a connection with a user terminal, and the sending unit is in a terminal A; the measuring unit 320 is configured to, after the user terminal is paired with, calculate a current distance to the user terminal; and the first executing unit 330 is configured to compare the current distance with a preset distance threshold, and if the current distance exceeds the distance threshold, display distance prompt information.

In the embodiment of the present invention, the apparatus further includes the receiving unit 340, configured to receive response information sent by the user terminal, where the response information is information that the user terminal is successfully paired with; and the selecting unit 350, configured to select a channel model equation according to a comparison between a theoretical distance and an input original distance.

The measuring unit 320 is specifically configured to detect space signal strength and a bit error rate to the receiving terminal regularly, and calculate the current distance to the receiving terminal by using the channel model equation.

The theoretical distance is a distance when signal strength is uniform and no building blockage is present to the receiving terminal; and the original distance is a distance when signal strength is not uniform due to blockages such as buildings and impurities to the receiving terminal.

The selecting unit 350 is specifically configured to, according to the difference between the theoretical distance and the input original distance, select a channel model equation from a plurality of mathematical models in a database program.

The apparatus further includes: the second executing unit 360, configured to, if the current distance does not exceed a distance threshold, continue to detect space signal strength and a bit error rate to the receiving terminal regularly, and calculate the current distance to the receiving terminal through the channel model equation.

In the embodiment of the present invention, the sending unit 310 sends pairing request information for establishing a connection with a terminal B; the terminal B validates the pairing request information, and then makes a response; the receiving unit 340 receives response information sent by the terminal B; according to the received response information, a prompt box for inputting an original distance pops up, and the original distance to the terminal B is input according to the prompt box; and the selecting unit 350 selects a channel model equation from a plurality of models in a database program according to a difference between a theoretical distance and the original distance, and the channel model equation is used for calculating a current distance.

The selecting unit 350 displays a channel model equation selection list, and the list displays a plurality of channel model equations selected according to the difference between the theoretical distance and the original distance. Each channel model equation may be used; however, after each channel model equation, calculation precision for calculating the distance to the terminal B by using each equation is listed. For example, calculation precision is optimal, and an error range is ±0.1%; calculation precision is less optimal, and an error range is ±0.5%; and calculation precision is normal, and an error range is ±1%. Finally, a user selects an optimal equation. Therefore, in the embodiment of the present invention, the selected channel model equation is the equation with the optimal calculation precision, so as to reduce a calculation error and improve accuracy of distance calculation.

The measuring unit 320 detects space signal strength and a bit error rate regularly, and according to the detected space signal strength and bit error rate, calculates the current distance to the terminal B.

After the measuring unit 320 calculates the current distance to the terminal B, a prompt box for setting a distance threshold of prompting an alarm pops up, and the distance threshold is input according to the prompt box.

The first executing unit 330 compares the calculated current distance with the set distance threshold, and if the current distance to the terminal B exceeds the distance threshold, the distance prompt information is displayed. Because a relationship between the terminal A and the terminal B is not fixed, the distance between the terminal A and the terminal B keeps changing, and if the current distance between the terminal A and the terminal B does not exceed the distance threshold, the second executing unit 360 continues to detect the space signal strength and the bit error rate regularly, and calculates the current distance to the terminal B by using the channel model equation.

In the embodiment of the present invention, the distance prompt information may be alarm information, for example, when the current distance exceeds the distance threshold, the terminal A displays alarm information, where the alarm information may be sound information or vibration information.

The apparatus described in the foregoing is a virtual apparatus corresponding to the method. In practical applications, a processor in the terminal A executes a sending command, and sends, through a communication module of the terminal A, pairing request information for establishing a connection to a receiving terminal, and receives, through the communication module, response information sent by terminal B, and the processor confirms, according to the response information, that the connection is successfully established with the terminal B.

After the connection is successfully established with the terminal B, the processor invokes an internal calculating module to calculate a theoretical distance, receives an original distance input by a user according to a coordinate position of the user, obtains a difference between the theoretical distance and the original distance, selects a plurality of channel model equations from a memory, and displays the plurality of channel model equations in a display screen for the user to select.

The user touches the display screen, the processor receives, through the display screen, information input by the user, the processor invokes a selected channel model equation according to the information of the user, uses the equation and the calculating module to calculate a current distance to the receiving terminal in real time, and transmits the current distance to the processor. The processor invokes an internal comparing module to compare the current distance with a threshold set by the user, outputs a comparison result in the display screen for reference by the user, and waits for the user to make a decision.

Through the description of the foregoing apparatus, the channel model equation is selected according to the difference between the theoretical distance and the original distance, and the selected channel model equation is used for calculating the current distance. Because error coefficients for calculating the current distance by using channel model equations are different, when the user selects the optimal channel model equation, a distance measurement error may be reduced, and calculation accuracy of the current distance may be improved; when the current distance exceeds the distance threshold, prompt information is displayed, which is convenient for the user to check; moreover, the method may be further applied to homes, kindergartens or agricultural production, so as to achieve an objective of preventing articles from being lost at the same time.

Persons skilled in the art may further be aware that, units and algorithm steps of the examples described in combination with the embodiments disclosed here may be implemented by electronic hardware, computer software, or a combination of the two. In order to clearly describe interchangeability between the hardware and the software, the foregoing has generally described compositions and steps of every example according to functions. Whether the functions are performed in a hardware or software manner depends on particular applications and design constraint conditions of the technical solutions. Persons skilled in the art may use different methods to implement the described functions for each particular application, but it should not be considered that the implementation goes beyond the scope of the present invention.

Steps of a method or an algorithm described in connection with the embodiments disclosed here may be implemented by using hardware, a software module performed by a processor, or a combination of the two. The software module may be disposed in a random access memory (RAM), a memory, a read only memory (ROM), an electrically programmable ROM, an electrically erasable programmable ROM, a register, a hard disk, a removable disk, a CD-ROM, or any other storage media well-known in the art.

The foregoing specific implementation manners further describe the objectives, technical solutions, and benefits of the present invention in detail. It should be understood that the foregoing description is merely specific implementation manners of the present invention, but is not intended to limit the protection scope of the present invention. Any modification, equivalent replacement, or improvement made within the spirit and principle of the present invention shall fall within the protection scope of the present invention.

What is claimed is:
1. A distance measurement and alarm method, comprising:
directly sending, by a sending terminal, pairing request information to a receiving terminal, wherein the pairing request information is configured to establish a direct connection between the sending terminal and the receiving terminal;
after the sending terminal is paired with the receiving terminal, calculating, by the sending terminal, a current distance to the receiving terminal; and
comparing, by the sending terminal, the current distance with a preset distance threshold, and if the current distance exceeds the distance threshold, displaying distance prompt information on the sending terminal.
2. The distance measurement and alarm method according to claim 1, wherein after the sending pairing request informa- tion for establishing a connection with a receiving terminal, the method further comprises:
- receiving response information sent by the receiving terminal, wherein the response information is information that the receiving terminal is successfully paired with;
- selecting a channel model equation according to a comparison between a theoretical distance and an input original distance;
- calculating the current distance to the receiving terminal by using the channel model equation; wherein
- the theoretical distance is a distance when signal strength is uniform and no building blockage is present to the receiving terminal; and the original distance is a distance when signal strength is not uniform due to blockages such as buildings and impurities to the receiving terminal.

3. The distance measurement and alarm method according to claim 2, wherein the selecting a channel model equation according to a comparison between a theoretical distance and an input original distance specifically is:
- according to a difference between the theoretical distance and the input original distance, selecting a channel model equation from a plurality of mathematical models in a database program.

4. The distance measurement and alarm method according to claim 2, wherein the calculating the current distance to the receiving terminal by using the channel model equation specifically is:
- detecting space signal strength and a bit error rate to the receiving terminal regularly, and calculating the current distance to the receiving terminal through the channel model equation.

5. The distance measurement and alarm method according to claim 1, further comprising:
- if the current distance does not exceed the distance threshold, continuing to detect space signal strength and a bit error rate to the receiving terminal regularly, and calculating the current distance to the receiving terminal through the channel model equation.

6. A distance measurement and alarm apparatus, comprising at least a processor executing program codes stored in a non-transitory computer-readable memory to perform functions as a plurality of units, wherein the plurality of units comprise:
- a sending unit, configured to directly send pairing request information to a receiving terminal to establish a direct connection between the apparatus and the receiving terminal;
- a measuring unit, configured to, after the apparatus is paired with the receiving terminal, calculate a current distance to the receiving terminal; and
- a first executing unit, configured to compare the current distance with a preset distance threshold, and if the current distance exceeds the distance threshold, display distance prompt information on the apparatus.

7. The distance measurement and alarm apparatus according to claim 6, further comprising:
- a receiving unit, configured to receive response information sent by the receiving terminal, wherein the response information is information that the receiving terminal is successfully paired with;
- a selecting unit, configured to select a channel model equation according to a comparison between a theoretical distance and an input original distance;
- the measuring unit is specifically configured to calculate the current distance to the receiving terminal by using the channel model equation; wherein
- the theoretical distance is a distance when signal strength is uniform and no building blockage is present to the receiving terminal; and the original distance is a distance when signal strength is not uniform due to blockages such as buildings and impurities to the receiving terminal.

8. The distance measurement and alarm apparatus according to claim 7, wherein the selecting unit is specifically configured to:
- according to a difference between the theoretical distance and the input original distance, select a channel model equation from a plurality of mathematical models in a database program.

9. The distance measurement and alarm apparatus according to claim 7, wherein the measuring unit is further specifically configured to: detect space signal strength and a bit error rate to the receiving terminal regularly, and calculate the current distance to the receiving terminal through the channel model equation.

10. The distance measurement and alarm apparatus according to claim 6, further comprising:
- a second executing unit, configured to, if the current distance does not exceed the distance threshold, continue to detect space signal strength and a bit error rate to the receiving terminal regularly, and calculate the current distance to the receiving terminal through the channel model equation.

* * * * *